US011624707B2

(12) United States Patent
Grobe et al.

(10) Patent No.: US 11,624,707 B2
(45) Date of Patent: Apr. 11, 2023

(54) METHOD AND APPARATUS FOR PERFORMING SPECTROMETRIC MEASUREMENTS

(71) Applicant: ADVA Optical Networking SE, Meiningen OT Dreissigacker (DE)

(72) Inventors: Klaus Grobe, Planegg (DE); Sander Jansen, Germering (DE)

(73) Assignee: ADVA Optical Networking SE, Meiningen-Dreissigacker (DE)

( * ) Notice: Subject to any disclaimer, the term of this patent is extended or adjusted under 35 U.S.C. 154(b) by 64 days.

(21) Appl. No.: 17/209,943

(22) Filed: Mar. 23, 2021

(65) Prior Publication Data
US 2021/0333205 A1    Oct. 28, 2021

(30) Foreign Application Priority Data
Apr. 27, 2020 (EP) .................................. 20171655

(51) Int. Cl.
*G01N 21/39* (2006.01)
*G01N 21/65* (2006.01)
(Continued)

(52) U.S. Cl.
CPC ............ *G01N 21/39* (2013.01); *G01N 21/65* (2013.01); *G01N 21/658* (2013.01);
(Continued)

(58) Field of Classification Search
None
See application file for complete search history.

(56) References Cited

U.S. PATENT DOCUMENTS 5,386,295 A * 1/1995 Switalski ................. G01J 3/44
356/417
6,455,854 B1 * 9/2002 Richman ............ G01N 21/3504
250/343
(Continued)

FOREIGN PATENT DOCUMENTS

CN  108291443 A  * 7/2018  ........... E21B 47/102
EP    2135060 B1 * 9/2015  ......... G01N 21/3504
WO WO-2012003046 A2 * 1/2012  ................ G01J 3/42

OTHER PUBLICATIONS

Kukushkin et al., "Highly sensitive detecdtion of influenza virus with SERS aptasensor," PLoS ONE, vol. 14, No. 4, pp. 1-14 (2019).
(Continued)

*Primary Examiner* — Violeta A Prieto
(74) *Attorney, Agent, or Firm* — Jenkins, Wilson, Taylor & Hunt, P.A.

(57) ABSTRACT

An apparatus adapted to perform spectrometric measurements, said apparatus comprising a tunable laser light source adapted to generate a laser light with an excitation wavelength supplied to an optical sensor which produces a sample specific response light signal; an optical reference filter adapted to measure laser light with the excitation wavelength fed back as a reference signal to provide wavelength calibration of the tunable laser light source; at least one optical measurement filter adapted to measure the sample specific response light signal produced by the optical sensor, wherein the optical reference filter and the at least one optical measurement filter are thermally coupled to maintain a constant wavelength relationship between the filter characteristics of the optical filters.

17 Claims, 7 Drawing Sheets

(51) Int. Cl.
*H01S 3/04* (2006.01)
*G01N 21/77* (2006.01)

(52) U.S. Cl.
CPC .......... *G01N 21/7703* (2013.01); *H01S 3/04* (2013.01); *G01N 2021/399* (2013.01)

(56) References Cited

U.S. PATENT DOCUMENTS

| | | | | |
|---|---|---|---|---|
| 8,111,392 | B1* | 2/2012 | Deck | G01J 3/021 |
| | | | | 356/301 |
| 2007/0023661 | A1* | 2/2007 | Wagner | G02B 5/208 |
| | | | | 348/E5.09 |
| 2007/0195320 | A1* | 8/2007 | Sriram | G01J 3/26 |
| | | | | 356/301 |
| 2010/0182607 | A1* | 7/2010 | Chau | G01N 21/7703 |
| | | | | 385/12 |
| 2017/0245796 | A1* | 8/2017 | Zalevsky | A61B 5/0015 |
| 2021/0298604 | A1* | 9/2021 | Kurki | G01J 3/44 |
| 2022/0018840 | A1* | 1/2022 | Akhtari | G01N 21/77 |

OTHER PUBLICATIONS

Wu et al., "A Simple SERS-Based Trace Sensing Platform Enabled by AuNPs-Analyte/AuNPs Double-Decker Structure on Wax-Coated Hydrophobic Surface," Frontiers in Chemistry, vol. 6, Article 482, pp. 1-9 (Oct. 2018).

Staudinger et al., "A versatile optode system for oxygen, carbon dioxide, and pH measurements in seawater with integrated battery and logger," Limnology and Oceaongraphy: Methods, pp. 459-473 (2018).

Durmanov et al., "Non-labeled selective virus detection with novel SERS-active porous silver nonofilms fabricated by Electron Beam Physical Vapor Deposition," Sensors and Actuators B, pp. 1-26 (2017).

Gu et al., "Recent advance in fiber SERS sensors," Proceedings of SPIE—The international Society for Optical Engineering, pp. 1-13 (Aug. 2008).

* cited by examiner

METHOD AND APPARATUS FOR PERFORMING SPECTROMETRIC MEASUREMENTS

PRIORITY CLAIM

This application claims the priority benefit of European Patent Application Number 20171655.2, filed Apr. 27, 2020, the disclosure of which is incorporated herein by reference in its entirety.

TECHNICAL FIELD

An optical spectrometer is an apparatus used to measure properties of light over a specific portion of an electromagnetic spectrum. An optical spectrometer can be used to perform spectroscopic analysis of investigated materials.

TECHNICAL BACKGROUND

When a light beam hits material it does interact with material in a specific way, dependent on the interplay between the light waves and the atoms and molecules that make up the respective matter. Interaction can leave the energy of matter light unchanged (e.g. refraction, reflection or elastic scattering) or can lead to an energy exchange between both. Interaction between light and investigated matter can be used in spectroscopy to characterize the respective matter. Accordingly, spectroscopy is the study of interaction between matter and light. There are different types of spectroscopy which are typically named after either the used light source or the process of light matter interaction exploited.

For example, Raman spectroscopy is commonly used in chemistry to provide a structural fingerprint by which molecules can be identified. Laser light generated by a laser light source interacts with molecular vibrations resulting in the energy of the laser photons being shifted up or down. The shift in energy provides information about the vibrational modes on the investigated matter. Typically, a sample is illuminated with a laser beam. An electromagnetic radiation from the illuminated spot can be collected. Elastic scattered radiation at the wavelength corresponding to the laser line (Rayleigh scattering) is filtered out by a filter where the rest of the collected light is dispersed onto a detector. However, Raman signals are inherently weak, especially when using visible light excitation and consequently only a low number of scattered photons are available for detection. A conventional method to amplify weak Raman signals is to employ Surface-Enhanced Raman Scattering (SERS). SERS uses nanoscale roughened metal surfaces that are typically made of gold (Au) or silver (Ag). Laser excitation of these roughened metal nanostructures resonantly drive the surface charges creating a highly localized (plasmonic) light field. When a molecule is absorbed or lies close to the enhanced field at the surface, a large enhancement in the Raman signal can be observed. Raman signals several orders of magnitude greater than normal Raman scattering are common, thereby making it possible to detect even low concentrations without the need for fluorescent labeling. A Raman signal can be amplified further when the roughened metal surface is used in combination with laser light that is matched to the absorption maxima of the molecule. This effect is also known as Surface-Enhanced Resonance Raman Scattering (SERRS).

SERS and other spectroscopic techniques can be used to detect various inorganic and organic substances, partially with high resolution and high sensitivity. Several of these conventional techniques have been implemented using fiber optic sensors. However, conventional spectroscopic apparatuses and methods rely on broadband spectrometers (fluorometers) and possibly broadband tunable excitation lasers to provide flexible measurement equipment. Accordingly, these conventional devices and methods are quite complex and they involve sophisticated hardware.

Accordingly there is a need to provide a method and apparatus which allow reliable spectrometric measurements of investigated materials which are easy to implement and which require a less complex hardware equipment.

SUMMARY

The invention provides according to a first aspect an apparatus adapted to perform spectrometric measurements, said apparatus comprising:

a tunable laser light source adapted to generate a laser light with an excitation wavelength supplied to an optical sensor which produces a sample specific response light signal, an optical reference filter adapted to measure laser light with the excitation wavelength fed back as a reference signal to provide wavelength calibration of the tunable laser light source, at least one optical measurement filter adapted to measure the sample specific response light signal produced by the optical sensor, wherein the optical reference filter and the at least one optical measurement filter are thermally coupled to maintain a constant wavelength relationship between the filter characteristics of the optical filters.

The apparatus according to the first aspect of the present invention does not form a broadband flexible spectrometer but uses a single or very few measurement filters instead. This is combined with certain limited excitation laser tunability sufficient to cover a few specific spectral peaks for being able to detect and discriminate different substances. Further, the apparatus according to the first aspect of the present invention comprises a temperature self-calibration.

In a possible embodiment of the apparatus according to the first aspect of the present invention, the optical reference filter and the at least one optical measurement filter are thermally coupled to provide a temperature drift self-calibration.

This can be achieved by using filters that belong to one thermal group, i.e. they are subject to similar temperature and related drift. That is, the filters can have a set/known passband difference. Further, this difference does not change significantly over a reasonable temperature range.

In a possible embodiment of the apparatus according to the first aspect of the present invention, the apparatus comprises at least one photo detector adapted to convert the sample specific excited response light signal into an electrical sample specific response signal supplied by the photo detector to a controller of the apparatus adapted to analyze the received electrical sample specific response signal to provide analytical results.

In a further possible embodiment of the apparatus according to the first aspect of the present invention, the controller is further adapted to control a tuning unit provided for tuning the excitation wavelength of the tunable laser light source.

In a further possible embodiment of the apparatus according to the first aspect of the present invention, the tuning unit comprises a thermal electric cooler attached to the tunable laser light source.

In a further possible embodiment of the apparatus according to the first aspect of the present invention, the apparatus comprises an optical coupling and splitting unit adapted to supply the laser light with the excitation wavelength generated by the tunable laser light source to the optical sensor and to supply the sample specific excited response light signal produced by the optical sensor to the photo detector of said apparatus.

In a further possible embodiment of the apparatus according to the first aspect of the present invention, the optical sensor is adapted to provide a sample specific response signal with wavelength shifts or based on reflections.

In a further possible embodiment of the apparatus according to the first aspect of the present invention, if the optical sensor is adapted to provide a sample specific response signal based on reflections, the controller of the apparatus is adapted to control the tuning unit to tune the laser light source in predefined wavelength increments.

In a further possible embodiment of the apparatus according to the first aspect of the present invention, the wavelength increment corresponds to a peak wavelength difference between the peak wavelength of the optical reference filter and the optical measurement filter or corresponds to a peak wavelength difference between peak wavelengths of two optical measurement filters with neighboring passband frequency bands.

In a possible embodiment of the apparatus according to the first aspect of the present invention, the optical filters are formed by liquid crystal filters.

In a further possible embodiment of the apparatus according to the first aspect of the present invention, the optical filters are formed by thin film filters.

In a still further possible embodiment of the apparatus according to the first aspect of the present invention, the optical filters are formed by Mach-Zehnder interferometers.

In a still further possible embodiment of the apparatus according to the first aspect of the present invention, the optical filters are formed by fiber Bragg gratings integrated in the optical sensor.

In a further possible embodiment of the apparatus according to the first aspect of the present invention, the optical sensor adapted to provide a sample specific excited response signal with wavelength shifts comprises a Surface-Enhanced Raman Spectroscopy, SERS, sensor.

In a further possible embodiment of the apparatus according to the first aspect of the present invention, the optical sensor adapted to produce a sample specific excited response signal with wavelength shifts comprises a Tip-Enhanced Raman Spectroscopy, TERS, sensor.

In a further possible embodiment of the apparatus according to the first aspect of the present invention, the optical sensor adapted to produce a sample specific excited response signal comprises an optrode which operates reflectively analytic specific (i.e. without wavelength shift).

In a still further possible embodiment of the apparatus according to the first aspect of the present invention, the optical sensor adapted to produce a sample specific excited response signal with wavelength shifts comprises an optrode sensor.

In a still further possible embodiment of the apparatus according to the first aspect of the present invention, the apparatus further comprises at least one monitoring photo diode adapted to generate a signal used by the controller of the apparatus to perform a power calibration of the tunable laser light source.

In a still further possible embodiment of the apparatus according to the first aspect of the present invention, the apparatus further comprises a user interface connected to the controller and comprising a display unit adapted to display analytical results calculated by the controller of the apparatus.

In a further possible embodiment of the apparatus according to the first aspect of the present invention, the apparatus is integrated in a handheld device.

In a further possible embodiment of the apparatus according to the first aspect of the present invention, the apparatus is adapted to perform SARS-CoV-2 detection.

The invention provides according to the second aspect a method for performing spectrometric measurements, comprising the steps of:

supplying a laser light generated by a tunable laser light source with an excitation wavelength to an optical sensor which produces a sample specific response light signal, measuring by an optical reference filter the laser light with the excitation wavelength and feeding it back as a reference signal to provide wavelength calibration of the tunable laser light source, measuring by an optical measurement filter the sample specific response light signal produced by the optical sensor and coupling thermally the optical reference filter and the measurement filter to maintain a stable wavelength relationship between the filter characteristics of the optical filters.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
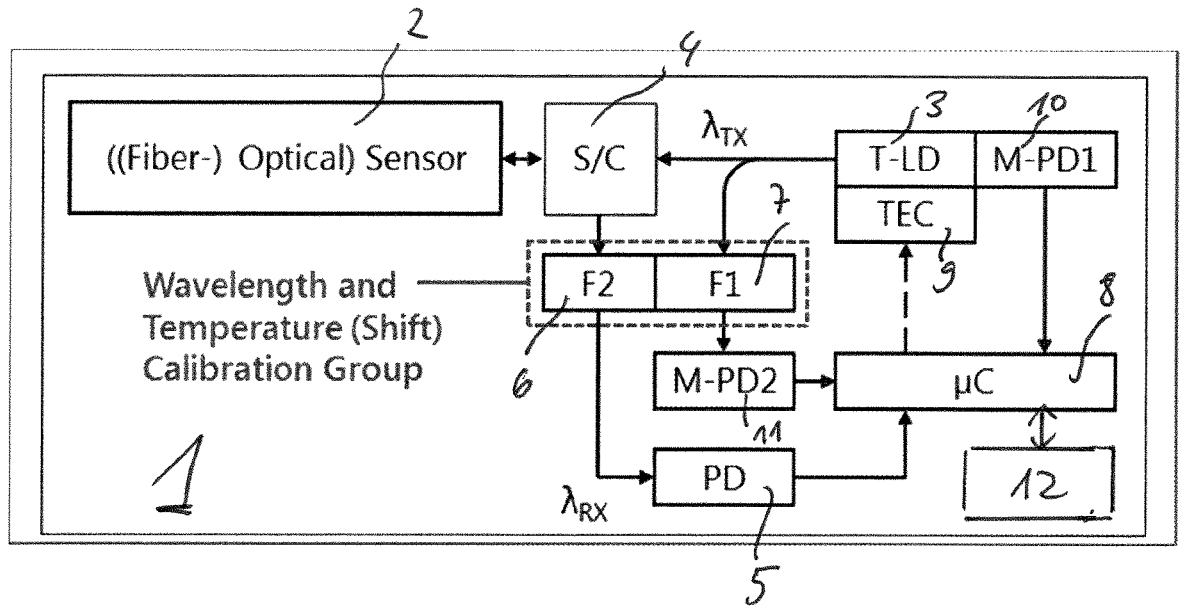
FIG. 1 shows a block diagram of a possible exemplary embodiment of an apparatus according to the first aspect of the present invention.

As can be seen from the embodiment illustrated in FIG. 1, the apparatus 1 according to the first aspect of the present invention is adapted to perform spectrometric measurements using at least one fiber optical sensor 2. The apparatus 1 comprises a tunable laser light source 3 adapted to generate a laser light with an excitation wavelength supplied to the optical sensor 2 by means of an optical coupling and splitting unit 4. The optical sensor 2 produces a sample specific response light signal. The optical coupling and splitting unit 4 of the apparatus 1 is adapted to supply the laser light with the excitation wavelength $\lambda_{TX}$ generated by the tunable laser light source 3 to the optical sensor 2 and to supply the sample specific excited response light signal produced by the optical sensor 2 to a photo detector 5 of the apparatus 1 via a measurement filter 6 as illustrated in the block diagram of FIG. 1. The at least one optical measurement filter 6 is adapted to measure the sample specific response light signal produced by the optical sensor 2 supplied via the optical coupling and splitting unit 4. Besides the at least one optical measurement filter 6, the apparatus 1 further comprises an optical reference filter 7 adapted to measure laser light with the excitation wavelength which is fed back as a reference signal to provide wavelength calibration of the tunable laser light source 3. The optical reference filter 7 and the at least one optical measurement filter 6 are thermally coupled to maintain a constant wavelength relationship between the filter characteristics of the optical filters 6, 7. In a possible embodiment, at least one optical measurement filter 6 and the optical reference filter 7 are thermally coupled to provide a temperature drift self-calibration.

The photo detector 5 of the apparatus 1 is adapted to convert the sample specific excited response light signal received via the measurement filter 6 into an electrical sample specific response signal supplied by the photo detector 5 to a controller 8 of the apparatus 1. The controller 8 is adapted to analyze the received electrical sample specific response signal to provide analytical results. The controller 8 is further adapted to control a tuning unit 9 provided for tuning the excitation wavelength $\lambda_{TX}$ of the tunable laser light source 3. In a possible implementation as illustrated in FIG. 1, the tuning unit 9 comprises a thermal electric cooler TEC attached to the tunable laser light source 3.

The apparatus 1 can further comprise as illustrated in FIG. 1 at least one monitoring photo diode adapted to generate a signal used by the controller 8 to perform a power calibration of the tunable laser light source 3. In the embodiment, shown in FIG. 1, the apparatus 1 comprises a first monitoring photo diode 10 and a second monitoring photo diode 11 to perform power calibration of the tunable laser light source 3 of the apparatus 1. The apparatus 1 can further comprise a user interface 12 connected to the controller 8 having a display unit adapted to display analyzing results calculated by the controller 8 to a user.

In the embodiment illustrated in FIG. 1, the fiber optical sensor 2 is adapted to produce a sample specific response signal returned to the coupling and splitting unit 4 to be measured by the optical measurement filter 6 of the apparatus 1. In the embodiment shown in FIG. 1, the optical sensor 2 is adapted to produce an analyte specific signal that is shifted against the excitation wavelength (e.g. because of Raman scattering). The sample specific optical response signal with the wavelength shift can be detected via a related measurement filter 6. In a possible embodiment, the optical measurement filter 6 comprises a passband filter. The optical passband filter comprises a peak wavelength and a narrow passband frequency band. In a possible implementation, the narrow passband frequency band has a frequency range of less than 1 nm. It is not necessary to know the absolute passband frequency of the measurement filter 6. The excitation laser, i.e. the laser light source 3, can be referenced in wavelength by the optical reference filter 7 as shown in the block diagram of FIG. 1. It is also not required to know the absolute passband peak frequency of the optical reference filter 7. If the passband peak frequency difference of the optical reference filter 7 and the optical measurement filter 6 is preset by design and is stable against temperature, a target specific response signal can be detected without absolute laser wavelength knowledge if the tunable laser light source 3 is locked to the peak frequency of the optical reference filter 7. Those absolute wavelengths or optical peak frequencies of the optical reference filter 7 and the measurement filter 6 are allowed to undergo a temperature drift simultaneously without compromising the spectroscopic measurement mechanism implemented in the apparatus 1 according to the present invention.

As illustrated in the block diagram of FIG. 1, the optical reference filter 7 and the at least one measurement filter 6 belong to the same thermal group, i.e. they are subject to a same temperature and related drift.

The optical filters 6, 7 implemented in the apparatus 1 shown in the block diagram of FIG. 1 can be formed by different kinds of filters including liquid crystal filters, thin film filters or Mach-Zehnder interferometers.

The coupling and splitting unit 4 of the apparatus 1 can comprise a directional fused fiber coupler with or without an asymmetric power ratio. The coupling and splitting unit 4 can further be formed by a circulator. In a still further possible implementation, the coupling and splitting unit 4 comprises a wavelength selective fiber coupler. The measurement filters 6 and the reference filter 7 allow relative wavelength calibration. Consequently, the respective spectroscopic techniques do not rely on absolute wavelength knowledge. With the apparatus 1 as illustrated in the embodiment of FIG. 1, the broadband spectrometer is replaced by at least one narrow band measurement filter 6 and a narrow band reference filter 7, capable of detecting characteristic spectral peaks within the sample specific response light signal generated by the optical sensor 2 of the apparatus 1.

Figure 2:
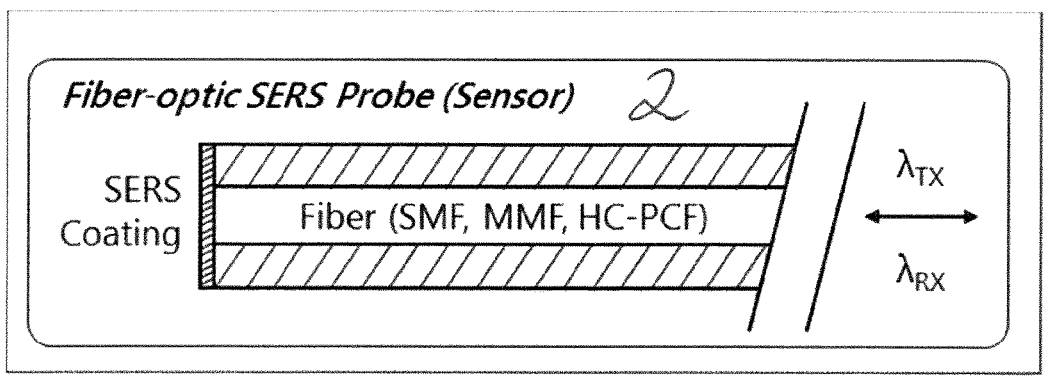
FIG. 2 illustrates a possible exemplary implementation of an optical sensor used by an apparatus according to the first aspect of the present invention.
Figure 3:
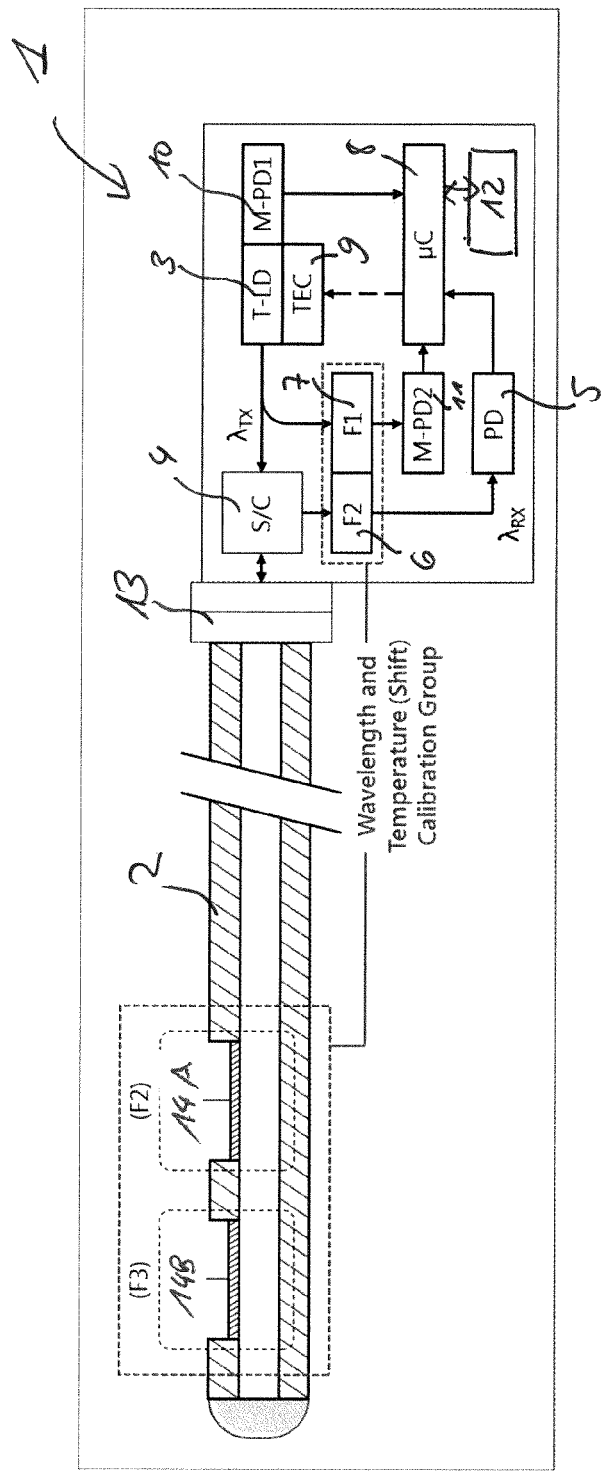
FIG. 3 shows a block diagram of a further possible exemplary embodiment of an apparatus according to the first aspect of the present invention.
Figure 4:
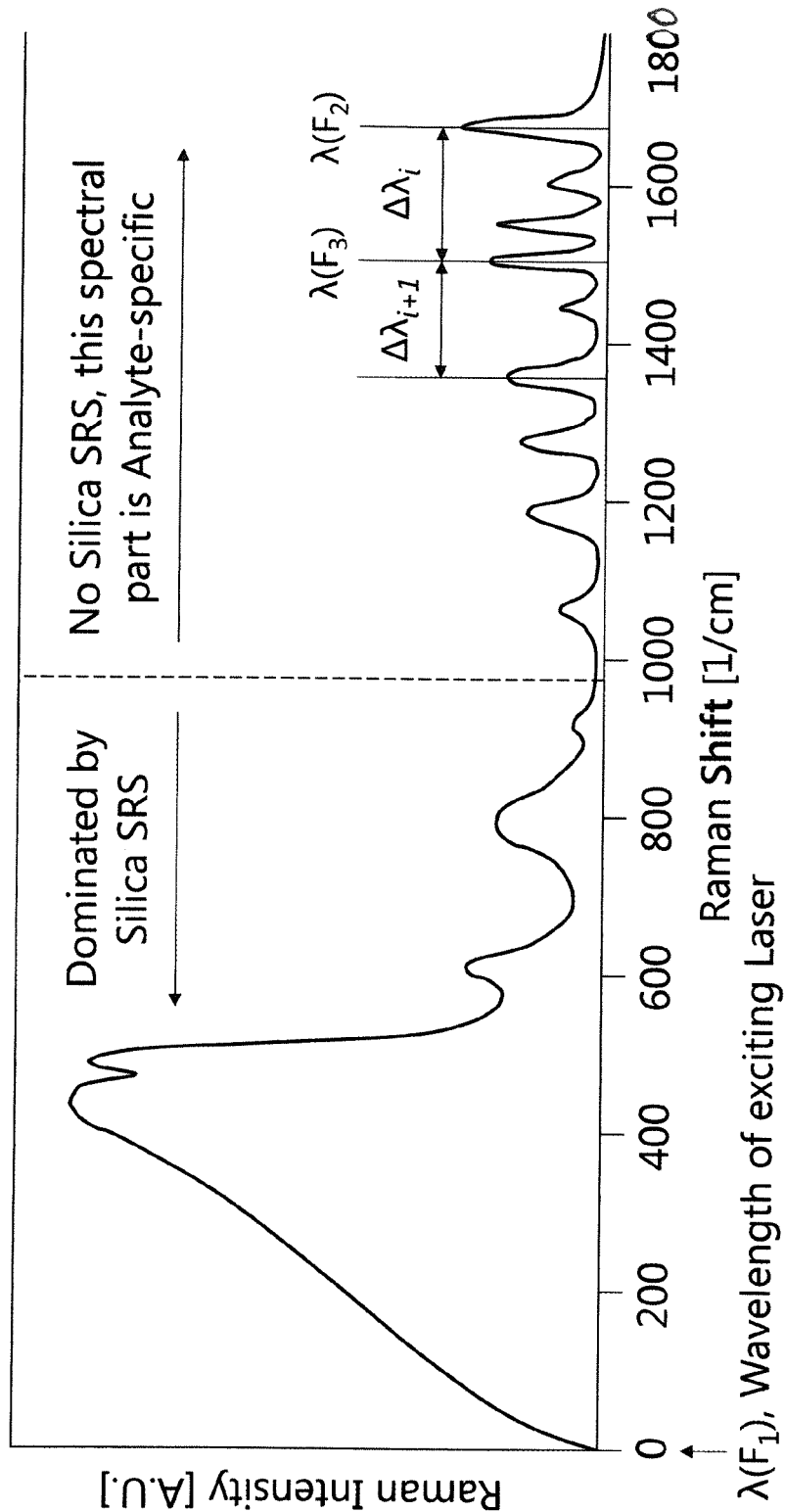
FIG. 4 shows a diagram for illustrating the operation of an apparatus according to the first aspect of the present invention.

FIG. 2 shows schematically a possible exemplary embodiment of a fiber optical sensor 2 which can be used in the apparatus 1 according to the first aspect of the present invention. In the illustrated embodiment, a SERS coating is provided at the tip of an optical fiber connected to the coupling and splitting unit 4 of the apparatus 1. In the illustrated example, a SERS substrate is coated on the tip of an optical fiber. When the intense light source, i.e. the laser light beam, hits a sample a part of the light is scattered in different directions. The majority of the scattered light has the same wavelength or color as the incident light, i.e. it is elastically scattered. However, a tiny fraction of the scattered light interacts with the matter it hits in a way that it exchanges small amounts of energy which is also called inelastic scattering. The change in energy of the scattered light results in a change of frequency and wavelength. As Raman signals are inherently weak a possible way to amplify weak Raman signals is to employ Surface-Enhanced Raman Scattering (SERS). SERS uses nanoscale roughened metal surfaces which can be typically made of gold or silver. Laser excitation of the roughened metal nanostructures resonantly drive the surface charges creating a highly localized light field. When a molecule is absorbed or lies close to the enhanced field at the surface, a large enhancement in the Raman signal can be observed. Surface-Enhanced Raman Spectroscopy is a surface-sensitive technique that enhances Raman scattering by molecules absorbed on rough metal surfaces or by nanostructures such as plasmonic magnetic silica nanotubes. The enhancement factor can reach as much as $10^{10}$ to $10^{11}$, which means the surface-sensitive technique can detect even single molecules. The Surface-Enhanced Raman Scattering SERS can also be used for virus detection. In this embodiment, the sensor can comprise a thin silver film with folded surface structure containing pore-like nanocavities and indentations which may be deposited on a microstructure by electron-beam physical vapor deposition. Pore-like structures can be semiregularly arrayed with a rough surface in-between allowing for SERS activity. Viral particles can be trapped in these structures and can generate a detectable enhanced Raman signal. In a possible implementation, the optical sensor 2 comprising a SERS coating as illustrated in FIG. 2 can also be used for SARS-CoV-2 detection. Accordingly, in a possible embodiment, the apparatus 1 according to the first aspect of the present invention comprises a virus detection apparatus. Because the apparatus 1 according to the present invention does not require a complex hardware equipment, its physical weight is comparatively low.

Accordingly, in a possible implementation, the apparatus 1 according to the first aspect of the present invention can be a handheld spectroscopic device to which a wide range of different optical sensors 2 can be coupled investigating different materials of samples. This handheld spectroscopic device or apparatus 1 can also be used for detection of a specific virus such as SARS-CoV-2.

The Raman shift is the energy difference between the incident laser light and the scattered detected light. This energy difference is connected to the energetic properties of the molecular vibrations of the investigated sample and hence independent of the laser light wavelength. The Raman shift can be expressed in wave numbers. The count rate comprises a number of events the photo detector 5 does register for the respective Raman shift per second of detector integration. It can be a proportion to the intensity of the light imaged to the photo detector 5.

The identification performed by the controller 8 using spectroscopy can be carried out by using a comparison algorithm and a spectral database. Analytical results can be output to a user via a display unit of the user interface 12 as shown in the block diagram of FIG. 1.

The optical reference filter 7 and the at least one measurement filter 6 are formed in a preferred embodiment by narrow bandpass filters BPFs which are used to pass (transmit) a range of wavelengths and to block (reflect) other wavelengths on either side of the bandpass filter range. The region of high transmittance is known as the passband and the region of high reflectance is known as the reject band or reflect band.

The passband and the reflect bands are separated by the role off region. The complexity of the bandpass filters depends on the steepness of the role off region, the width of the passband and also on the ripple and insertion loss specifications in the passband. Different embodiments and different implementations for the optical filters 6, 7 can be used. The optical filters 6, 7 may comprise liquid crystal filters, thin film filters or Mach-Zehnder interferometers.

The optical sensor 2 of the apparatus 1 is adapted to produce a sample specific response signal with wavelength shifts, e.g. because of Raman scattering. In an alternative embodiment, the optical sensor 2 can also operate based on reflections. In case that the optical sensor 2 is adapted to produce a sample specific response signal based on reflections, the controller 8 controls the tuning unit 9 which tunes the laser light source 3 in predefined wavelength increments. Wavelength increments can correspond to a peak wavelength difference between the peak wavelength of the optical reference filter 7 and the optical measurement filter 6. Further, the wavelength increment can also correspond to a peak wavelength difference between peak wavelengths of two optical measurement filters 6 having neighboring passband frequency bands.

The apparatus 1 can use different kinds of optical sensors 2 adapted to produce a sample specific excited response signal. Besides the Surface-Enhanced Raman Spectroscopy, SERS, sensor illustrated in FIG. 2, the optical sensor 2 may also comprise a Tip-Enhanced Raman Spectroscopy, TERS, sensor. The fiber optical sensor 2 can also comprise an optrode or optode sensor.

A group of target spectroscopic techniques does rely on wavelength shifts. This holds e.g. for SERS/TERS sensors and for FOCS and optrodes, which make use of fluorescence effects. Another technique makes use of interferometry. Interferometry is a technique in which waves, usually electromagnetic waves, are superimposed causing the phenomenon of interference which can be used to extract information about investigated material. Spectroscopic techniques which rely on wavelength shifts may use an optical sensor having a sensor area which is coated with an analyte specific coating and is illuminated with a certain excitation wavelength. Wavelength requirements are not high because the analyte specificity results from the coating of the sensor area. It is also possible that several coating areas can be illuminated with different wavelengths so that a rough knowledge of the laser wavelength provided by the reference filter 7 is required.

FIG. 3 shows a further possible exemplary embodiment of an apparatus 1 according to the first aspect of the present invention. In the illustrated embodiment, the optical sensor 2 is mechanically connected to the coupling and splitting unit 4 by means of a connector 13. Accordingly, in a possible embodiment, the optical sensor 2 can be replaced by another optical sensor 2 for different use cases. The optical sensor 2 comprises in the illustrated embodiment two coating sections 14A, 14B that allow detection of different analytes by different wavelength shifted responses, e.g. caused by SERS to discriminate between two analytes. The laser light source 3 is referenced to the optical reference filter 7 (F1). Once the laser light source 3 aligns with the optical reference filter 7, a main spectral response peak of coating 14A can be detected by a measurement filter 6 (F2). In order to detect the main response peak of coating 14B which is shifted against the main peak of coating 14A, the laser light source 3 is tuned by this wavelength shift. Then, the spectral response peak produced by coating 14B is detected by a measurement filter 6 of the apparatus 1. This process is similar to the case where several peaks produced by one coating section are interrogated. Consequently, the tuning range is limited likewise. This can be combined, i.e. both coatings 14A, 14B can produce several peaks that are interrogated. As also illustrated in FIG. 3, the coatings 14A, 14B as well as the measurement filter 6 and the reference filter 7 are thermally coupled and form part of the same thermal group.

FIG. 4 shows a spectral diagram for illustrating the operation of an apparatus 1 as illustrated in the embodiments of FIGS. 1, 3. Initially the laser light source 3 of the apparatus 1 is referenced to the optical reference filter 7 (F1). Then, the filter characteristic of the measurement filter 6 (F2) is chosen such that it directly detects the main response peak of the target analyte when the laser light source 3 aligns with the reference frequency of the optical reference filter 7.

In order to detect other characteristic spectral peaks, e.g. to make the analytic detection more unambiguous, the laser light source 3 is tuned incrementally by $\Delta\lambda_i$ as shown in FIG.

4 to detect a respective peak within the frequency range of the measurement filter 6. The tuning range can be several tenths of nanometers.

Figure 5:
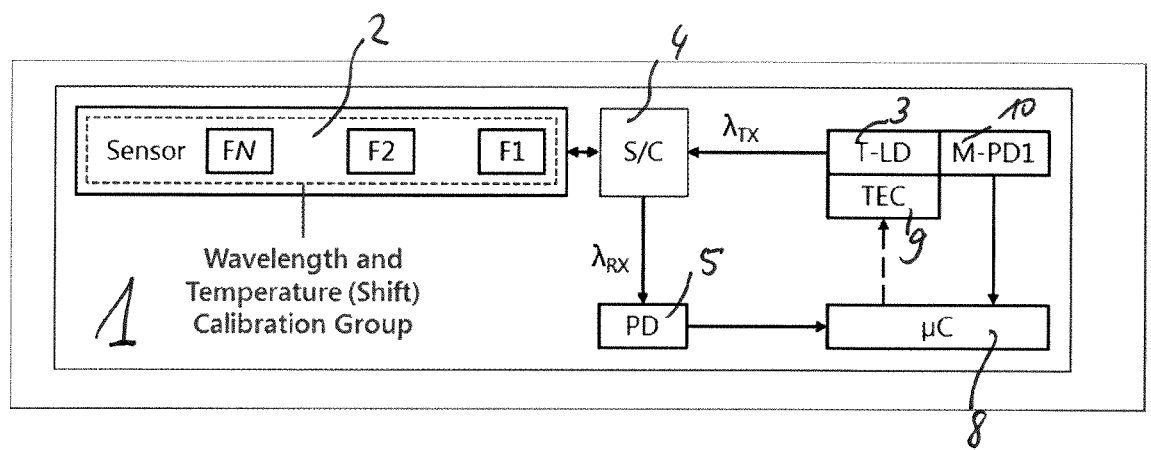
FIG. 5 shows a block diagram of a further possible embodiment of the apparatus according to the first aspect of the present invention.

FIG. 5 shows a further possible embodiment of an apparatus 1 according to the first aspect of the present invention adapted to perform spectrometric measurements. In this embodiment, the filters form part of the optical sensor 2. In this embodiment, the optical sensor 2 has sections with integrated filters that produce wavelength shifts or direct reflections. In case of laser reflections, the specific signal is caused by externally influencing the respective section of the optical sensor 2 by a specific event, e.g. via a specific coating. To discriminate between these events, the wavelength relative between the sections has to be known. If the sections of the measurement filters 6 also produce shifts, an RX filter in front of the photo detector 5 can be provided.

In case that the sections of the measurement filters 6 produce direct reflections, a specific signal can be detected via related measurement filters 6 integrated in the optical sensor 2. If the passband peak difference between the reference frequency of the optical reference filter 7 and the at least one measurement filter 6 is preset by design and stable against temperature, a specific response signal can be detected without absolute laser wavelength knowledge if the laser light source 3 is referenced to the reference frequency of the optical reference filter 7. Even if the measurement filter 6 requires an absolute wavelength, for the reference filter 7 and the laser light source 3 only a relative wavelength is required.

Figure 6:
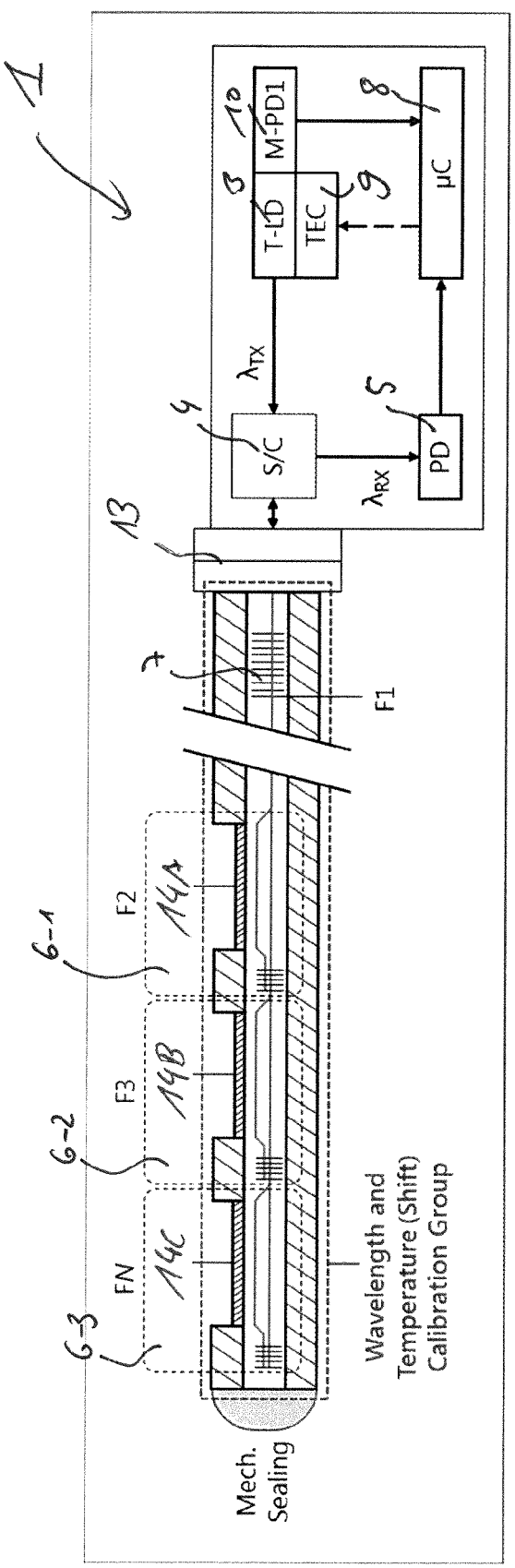
FIG. 6 shows a possible exemplary implementation of the embodiment illustrated in FIG. 5.

FIG. 6 shows a possible implementation of the embodiment illustrated in FIG. 5. In the embodiment shown in FIG. 6, the combination of a specific coating 14A, 14B, 14C with an interferometer and a fiber Bragg grating provides an analyte specific optical detection sensor 2 including reflective measurement filters 6-1, 6-2, 6-3. In order to interrogate the different reflective filters 6-1, 6-2, 6-3, the laser light source 3 is first referenced to the reference filter 7 implemented as a fiber Bragg grating. From this initial frequency, the tunable laser light source 3 is incrementally tuned to the wavelength corresponding with the reflective filters 6-1, 6-2, 6-3. The tuning range can comprise several nanometers. In the illustrated embodiment of FIG. 6, the optical sensor 2 comprises the integrated optical reference filter 7 and the optical measurement filters 6-1, 6-2, 6-3 having the coatings 14A, 14B, 14C. The optical reference filter 7 and the optical measurement filters 6-1, 6-2, 6-3 are thermally coupled to maintain a constant wavelength relationship between the filter characteristics of the optical filters 6, 7. The absolute passband peak has not to be known even for a series of reflective fiber Bragg gratings as shown in the embodiment of FIG. 6. As long as the wavelength of the related laser light can be referenced to the reference filter 7, the measurement filters 6-1, 6-2, 6-3 can be interrogated by relative tuning. This does reduce the required complexity of the apparatus 1 according to the present invention.

The optical reference filter 7 and the at least one optical measurement filters 6 are thermally coupled to maintain a constant wavelength relationship. The thermal expansion coefficient TEC is about $0.5 \times 10^{-6}$ °C.$^{-1}$ and is smaller by a factor of about 20 compared to the thermo-optic coefficient TOC which changes the refractive index n. For optical fibers, TOC is about $10 \times 10^{-6}$ °C.$^{-1}$.

When an optical fiber is (homogeneously) temperature-shifted, the Bragg wavelengths $\lambda_B$ of the different fiber Bragg gratings are shifted by the same temperature-induced factor which is negligible for reasonable wavelength increments between different fiber Bragg gratings. Otherwise, it can be considered by simple temperature measurement and applying a correction factor for the incremental tuning.

The temperature-induced AWG wavelength shift is:

$$\frac{\partial \lambda}{\partial T} = \frac{\lambda}{nL}\left(\frac{\partial (nL)}{\partial T}\right) = \frac{\lambda}{nL}\left(n\frac{\partial L}{\partial T} + L\frac{\partial n}{\partial T}\right) = \lambda\left(\frac{1}{L}\frac{\partial L}{\partial T} + \frac{1}{n}\frac{\partial n}{\partial T}\right) = \lambda\left(\alpha + \frac{1}{n}\frac{\partial n}{\partial T}\right)$$

For silica, dn/dT is in the range of $7.5 \times 10^{-6}$/° C. and for silicon, $\alpha = 2.6$ ppm/° C., respectively. Further, L is the path length in the array. Accordingly, a silica-on-silicon device hence has a wavelength drift (red shift) of d$\lambda$/dT of about 12 pm/° C. (at a wavelength of 1550 nm). The difference between two filter passbands is in the same order of magnitude as for the fiber Bragg gratings FBG.

Figure 7:
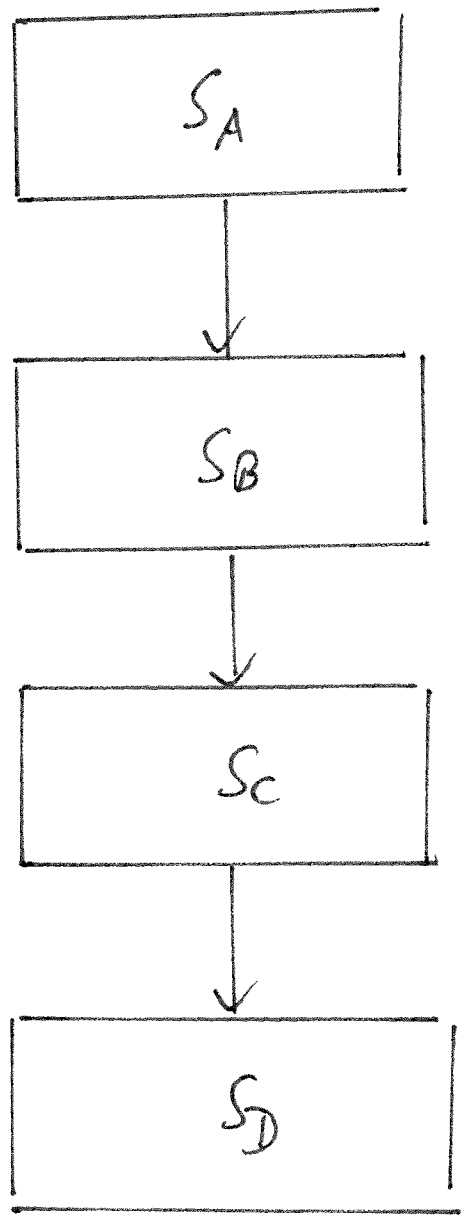
FIG. 7 shows a flowchart of a possible exemplary embodiment of a method according to a second aspect of the present invention.

FIG. 7 shows a simple flowchart illustrating a possible embodiment of a method for performing spectrometric measurements according to the second aspect of the present invention.

In a first step SA, the laser light is generated by the tunable laser light source 3 with an excitation wavelength $\lambda_{Tx}$ supplied to an optical sensor 2 which produces a sample specific response light signal.

In a further step SB, the laser light with the excitation wavelength is measured by an optical reference filter 7 and fed back as a reference signal to provide wavelength calibration of the tunable laser light source 3.

In a further step SC, the sample specific response light signal produced by the optical sensor 2 is measured by at least one optical measurement filter 6.

During the measurements in step SB, SC, the optical reference filter 7 and the measurement filter 6 are thermally coupled to maintain a stable wavelength relationship between the filter characteristics of the optical filters 6, 7. This is illustrated as step SD in the simplified flowchart of FIG. 7.

Figure 8:
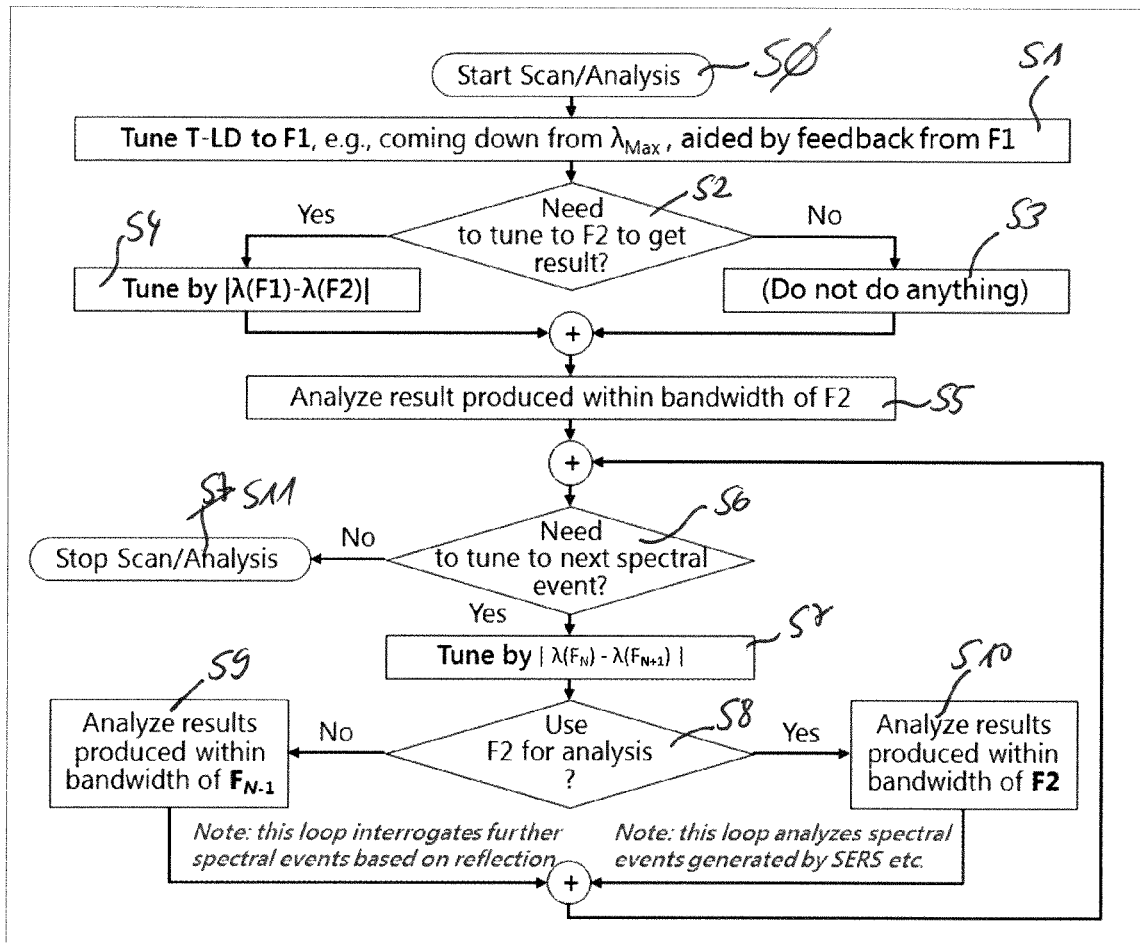
FIG. 8 shows a further more detailed flowchart for illustrating the operation of a method for performing spectrometric measurements according to the second aspect of the present invention.

FIG. 8 shows a more detailed flowchart for illustrating the method for performing a spectrometric measurement according to the second aspect of the present invention. In a step S0, the spectrometric measurement is started.

In a further step S1, the tunable laser light source 3 is tuned to the optical reference filter 7 using the feedback signal provided by the reference filter 7. The laser light with the excitation wavelength can be fed back as a reference signal to provide wavelength calibration of the tunable laser light source 3. The tuning can be performed beginning with a maximum wavelength $\lambda_{max}$.

In a further step S2, it is checked whether it is required to tune to the peak frequency of the optical measurement filter 6 to get an analytical result. This depends on whether the optical sensor 2 is adapted to produce a sample specific response signal based on reflections or to produce a sample specific response signal with wavelength shifts such as caused by Raman scattering. In case that the optical sensor 2 is adapted to produce a sample specific response signal with wavelength shifts, no tuning is required as performed in step S3 as shown in FIG. 8. In contrast, if the optical sensor 2 is adapted by design to provide a sample specific response signal based on reflections, tuning is required and performed in step S4 as shown in FIG. 8. Accordingly, if the optical sensor 2 is adapted to produce a sample specific response signal based on reflections, the controller 8 of the apparatus 1 controls in a possible embodiment the tuning unit 9 to tune the laser light source 3 in predefined wavelength increments. As illustrated in step S4, a wavelength increment corresponds to the peak wavelength difference between the two peak wavelengths of the optical reference filter 7 and the optical measurement filter 6.

In a further step S5, an analytical result is produced within the bandwidth of the optical measurement filter 6.

In a further step S6, it is checked whether it is necessary to tune to a next spectral event. If this is not the case, the process stops in step S11. Otherwise, the tunable laser light source 3 is tuned by an increment which corresponds to the peak wavelength difference between two peak wavelengths of two optical measurement filters 6 having neighboring passband frequency bands in step S7.

In step S8, it is checked whether to use the measurement signal of measurement filter 6 for analysis. If the optical sensor 2 is adapted to produce a sample specific response signal based on reflections, the process continues with step S9, whereas if the optical sensor 2 is adapted to produce a sample specific response signal with wavelength shifts, the process continues with step S10. In step S9, the results produced within the bandwidth of the next measurement filter 6 are analyzed. Accordingly, the process loop including steps S6, S7, S8, S9 is adapted to interrogate further spectral events based on reflection.

In contrast, in step S10, results produced within the bandwidth of the measurement filter 6 are analyzed. Consequently, the process loop comprising steps S6, S7, S8, S10 analyzes spectral events wherein a sample specific response signal is produced with wavelength shifts caused e.g. by Raman scattering.

As can be seen from the flowchart in FIG. 8, only the wavelength increment between two neighboring measurement filters or between a measurement filter 6 and the reference filter 7 has to be known a priori. This increment can be set by filter design.

The method and apparatus 1 according to the present invention can use fiber optical sensors 2 which detect a single or very few specific spectral peaks only. The apparatus 1 according to the present invention does not comprise a broadband flexible spectrometer but uses a single or a very few narrow band optical filters 6, 7 instead. This is combined with a certain limited excitation laser tunability sufficient to cover a few specific spectral peaks for being able to detect and discriminate for instance two different substances. Because of few components required for the hardware equipment of the apparatus 1 according to the present invention, this allows for cheap mass production of the apparatus 1. In a possible use case, the apparatus 1 can comprise a handheld device used for detection of a specific virus such as SARS-CoV-2 detection. Accordingly, in a possible implementation, the apparatus 1 can be implemented as a handheld spectroscopic virus scanning device which can be used in the field. The handheld spectroscopic apparatus 1 can comprise a connector 13 which allows to replace the used optical sensor 2.

What is claimed is:

1. An apparatus adapted to perform spectrometric measurements, said apparatus comprising:
    a tunable laser light source adapted to generate a laser light with an excitation wavelength supplied to an optical sensor which produces a sample specific response light signal;
    an optical reference filter adapted to measure laser light with the excitation wavelength fed back as a reference signal to provide wavelength calibration of the tunable laser light source;
    at least one optical measurement filter adapted to measure the sample specific response light signal produced by the optical sensor;
    wherein the optical reference filter and the at least one optical measurement filter are thermally coupled to maintain a constant wavelength relationship between the respective filter characteristics of the optical reference filter and the at least one optical measurement filter, wherein the optical reference filter and the at least one optical measurement filter belong to one thermal group, so that they are subject to a same temperature and related drift.

2. The apparatus according to claim 1 wherein the optical reference filter and the at least one optical measurement filter are thermally coupled to provide a temperature drift self-calibration.

3. The apparatus according to claim 2 further comprising a photo detector adapted to convert the sample specific excited response light signal into an electrical sample specific response signal supplied by the photo detector to a controller of the apparatus adapted to analyze the received electrical sample specific response signal.

4. The apparatus according to claim 3 wherein the controller is further adapted to control a tuning unit provided for tuning the excitation wavelength of the tunable laser light source.

5. The apparatus according to claim 4 wherein the tuning unit comprises a thermal electric cooler attached to the tunable laser light source.

6. The apparatus according to claim 4 wherein if the optical sensor is adapted to produce a sample specific response signal based on reflections, the controller controls the tuning unit to tune the laser light source in predefined wavelength increments.

7. The apparatus according to claim 6 wherein the wavelength increment corresponds to a peak wavelength difference between the peak wavelengths of the optical reference filter and the optical measurement filter or corresponds to a peak wavelength difference between peak wavelengths of two optical measurement filters with neighboring passband frequency bands or corresponds to a peak wavelength difference between the peak wavelengths of the optical reference filter and the peak reflection wavelengths of the reflective measurement filters.

8. The apparatus according to claim 3 further comprising an optical coupling and splitting unit adapted to supply the laser light with the excitation wavelength generated by the tunable laser light source to the optical sensor and to supply the sample specific excited response light signal produced by the optical sensor to the photo detector of said apparatus.

9. The apparatus according to claim 3 further comprising at least one monitoring photo diode adapted to generate a signal used by the controller to perform a power calibration of the tunable laser light source.

10. The apparatus according to claim 3 further comprising a user interface connected to the controller and comprising a display unit adapted to display analytical results calculated by the controller.

11. The apparatus according to claim 1 wherein the optical sensor is adapted to produce a sample specific response signal with wavelength shifts or based on reflections.

12. The apparatus according to claim 1 wherein the optical reference filter and the at least one measurement filter comprise passband filters with a peak wavelength and with a narrow passband frequency band of less than 1 nm.

13. The apparatus according to claim 1 wherein the optical filters are formed by liquid crystal filters, thin film filters, Mach-Zehnder interferometers, and/or fiber Bragg gratings integrated in the optical sensor.

14. The apparatus according to claim 1 wherein the optical sensor is adapted to produce a sample specific excited response signal with wavelength shifts comprises a Surface-Enhanced Raman Spectroscopy, SERS, sensor, a Tip-Enhanced Raman Spectroscopy, TERS, sensor, or an optrode sensor.

15. The apparatus according to claim 1 wherein the apparatus is integrated in a handheld device.

16. A method for performing spectrometric measurements, said method comprising:
   supplying a laser light generated by a tunable laser light source with an excitation wavelength to an optical sensor which produces a sample specific response light signal;
   measuring by an optical reference filter the laser light with the excitation wavelength and feeding it back as a reference signal to provide wavelength calibration of the tunable laser light source;
   measuring by an optical measurement filter the sample specific response light signal produced by the optical sensor; and
   coupling thermally the optical reference filter and the measurement filter to maintain a stable wavelength relationship between the respective filter characteristics of the optical reference filter and the at least one optical measurement filter, wherein the optical reference filter and the at least one optical measurement filter belong to one thermal group, so that they are subject to a same temperature and related drift.

17. A virus detection device comprising apparatus adapted to perform spectrometric measurements, said apparatus comprising:
   a tunable laser light source adapted to generate a laser light with an excitation wavelength supplied to an optical sensor which produces a sample specific response light signal;
   an optical reference filter adapted to measure laser light with the excitation wavelength feedback as a reference signal to provide wavelength calibration of the tunable laser light source;
   at least one optical measurement filter adapted to measure the sample specific response light signal produced by the optical sensor;
   wherein the optical reference filter and the at least one optical measurement filter are thermally coupled to maintain a constant wavelength relationship between the respective filter characteristics of the optical reference filter and the at least one optical measurement filter, wherein the optical reference filter and the at least one optical measurement filter belong to one thermal group, so that they are subject to a same temperature and related drift.

* * * * *